United States Patent
Lin et al.

(10) Patent No.: US 12,245,086 B2
(45) Date of Patent: Mar. 4, 2025

(54) EFFICIENT 3D MOBILITY SUPPORT USING REINFORCEMENT LEARNING

(71) Applicant: Telefonaktiebolaget LM Ericsson (PUBL), Stockholm (SE)

(72) Inventors: Xingqin Lin, San Jose, CA (US); Yun Chen, Austin, TX (US); Mohammad Mozaffari, Fremont, CA (US); Talha Khan, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 28 days.

(21) Appl. No.: 17/766,317

(22) PCT Filed: Oct. 5, 2020

(86) PCT No.: PCT/IB2020/059333
§ 371 (c)(1),
(2) Date: Apr. 4, 2022

(87) PCT Pub. No.: WO2021/064713
PCT Pub. Date: Apr. 8, 2021

(65) Prior Publication Data
US 2024/0056933 A1    Feb. 15, 2024

Related U.S. Application Data

(60) Provisional application No. 62/911,047, filed on Oct. 4, 2019.

(51) Int. Cl.
*H04W 36/00*    (2009.01)
*H04W 36/24*    (2009.01)
*H04W 36/32*    (2009.01)

(52) U.S. Cl.
CPC ... *H04W 36/0058* (2018.08); *H04W 36/0083* (2013.01); *H04W 36/0055* (2013.01); *H04W 36/24* (2013.01); *H04W 36/322* (2023.05)

(58) Field of Classification Search
None
See application file for complete search history.

(56) References Cited

U.S. PATENT DOCUMENTS

| | | | |
|---|---|---|---|
| 2015/0319668 A1 | 11/2015 | Guo | |
| 2016/0205667 A1* | 7/2016 | Shen | H04B 17/309 370/252 |

(Continued)

FOREIGN PATENT DOCUMENTS

| | | | |
|---|---|---|---|
| CN | 109447275 A | 3/2019 | |
| CN | 109495935 A | 3/2019 | |

(Continued)

OTHER PUBLICATIONS

First Office Action dated Oct. 26, 2023 for Chinese Patent Application No. 202080083693.9, 15 pages (includes English translation).

(Continued)

*Primary Examiner* — Angela Nguyen
(74) *Attorney, Agent, or Firm* — Sage Patent Group

(57) ABSTRACT

According to some embodiments, a method performed by a network node for mobility management comprises obtaining data samples for modeling a wireless network environment that comprises a plurality of cells and building a machine learning model of the wireless network using the obtained data samples. The machine learning model is trained to determine a sequence of handovers for a wireless device among the plurality of cells for the wireless device to traverse from a source cell to a destination cell. The method further comprises receiving mobility information for a wireless device, determining one or more handover operations for the wireless device based on the mobility information, and transmitting the one or more handover operations to the wireless device.

22 Claims, 16 Drawing Sheets

(56) References Cited

U.S. PATENT DOCUMENTS

2019/0261193 A1    8/2019  Torsner et al.
2021/0360495 A1*  11/2021  Lovlekar ............. H04W 36/305

FOREIGN PATENT DOCUMENTS

EP        2 418 889 A1    2/2012
WO     2018 125686 A2    7/2018

OTHER PUBLICATIONS

SA WG2 Meeting #125; Gothenburg, Sweden; Source: Huawei, HiSilicon; Title: Discussion on big data and 5G (S2-181250)—Jan. 22-26, 2018.
PCT International Search Report issued for International application No. PCT/IB2020/059333—Dec. 15, 2020.
PCT Written Opinion of the International Searching Authority issued for International application No. PCT/IB2020/059333—Dec. 15, 2020.
Playtoni Meetei, Kh. et al.; "Handoff Management in Wireless Networks Using Predictive Modelling"; 2011 National Conference on Communications (NCC); Jan. 28-30, 2011; XP031983113; 5 pages.
Second Office Action mailed Apr. 11, 2024 for CN Patent Application No. 202080083693.9, 19 pages . (includes English translation).

* cited by examiner

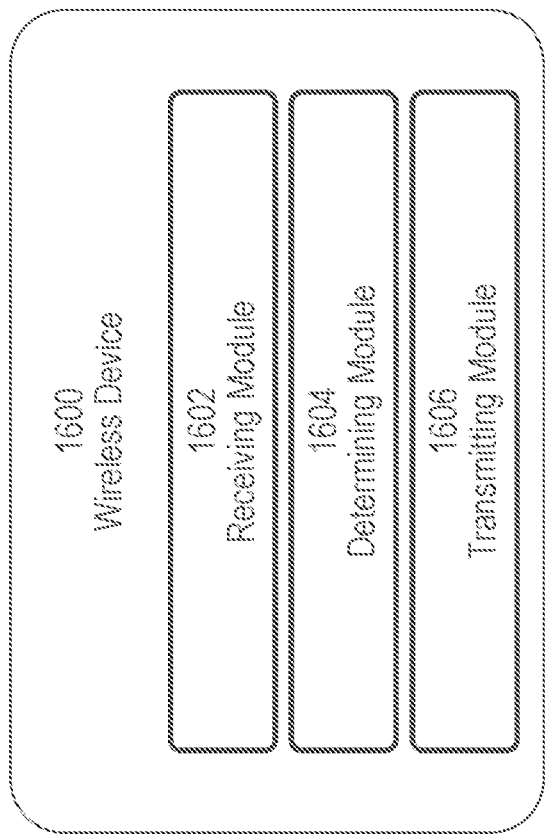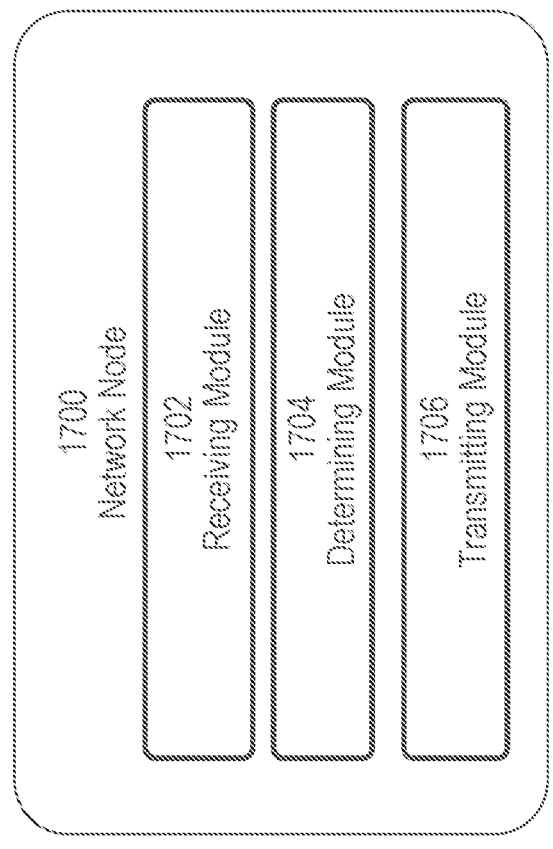
Fig. 11

EFFICIENT 3D MOBILITY SUPPORT USING REINFORCEMENT LEARNING

PRIORITY

This nonprovisional application is a U.S. National Stage Filing under 35 U.S.C. § 371 of International Patent Application Serial No. PCT/IB2020/059333 filed Oct. 5, 2020 and entitled "EFFICIENT 3D MOBILITY SUPPORT USING REINFORCEMENT LEARNING" which claims priority to U.S. Provisional Patent Application No. 62/911,047 filed Oct. 4, 2019, both of which are hereby incorporated by reference in their entirety.

TECHNICAL FIELD

Embodiments of the present disclosure are directed to wireless communications and, more particularly, to efficient three-dimensional (3D) mobility support using reinforcement learning.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) Release 8 specifies the evolved packet system (EPS). EPS is based on the long-term evolution (LTE) radio network and the evolved packet core (EPC). It was originally intended to provide voice and mobile broadband (MBB) services but has continuously evolved to broaden its functionality. Since Release 13 narrowband Internet of Things (NB-IoT) and LTE for machine type communication (LTE-M) are part of the LTE specifications and provide connectivity to massive machine type communications (mMTC) services.

3GPP Release 15 developed the first release of the fifth generation (5G) wireless network system. 5G is a new generation radio access technology intended to serve use cases such as enhanced mobile broadband (eMBB), ultra-reliable and low latency communication (URLLC) and mMTC. 5G includes the new radio (NR) access stratum interface and the 5G core network (5GC). The NR physical and higher layers reuse parts of the LTE specification, and to that add needed components when motivated by the new use cases.

Mobile networks traditionally serve devices on the ground, but interest and business case for using mobile networks, including both existing LTE networks and emerging 5G networks, to provide connectivity to low altitude drones have been growing fast. With their mobility, agility, and flexibility, drones are widely used in various applications. In particular, drone user equipments (UEs) play a key role in a number of scenarios such as package delivery, remote sensing, and surveillance applications. To operate properly, flying drones need to be effectively supported via cellular networks (referred to as cellular-connected drones) to ensure seamless connectivity and low-latency communications. In this regard, there is a need for efficient handover (HO) mechanisms for drone mobility management to provide reliable communications between base stations (BSs) and drones.

Handover is a process in which user-base station association in a cellular network changes so that the user maintains their connectivity while moving through different cells. A UE is either in an idle/inactive or connected mode. In idle mode, the UE camps on a cell and does not have any active signaling or data-bearers to the network. However, when in connected mode the network allocates resources to the UEs and handover involves active signaling on the data and control channels between users and BSs and signaling between source and target cells, thus causing overhead in the cellular network.

In principle, the number of handovers depends on the various factors such as the number of BSs, location, speed, and trajectory of mobile users, reference signal received power (RSRP) variations, reference signal received quality (RSRQ) variations, and the handover mechanism. While evaluating the mobility performance and handover mechanisms, several key metrics besides the number of handovers can be considered, such as: signal quality, signaling overhead, the number of radio link failures (RLF), and the rate of ping-pong handovers.

The following handover procedure in LTE is used as an example to illustrate how connected mode mobility typically works. The network triggers the handover procedure, e.g. based on radio conditions and load. To facilitate this, the network may configure the UE to perform measurement reporting. The network may also initiate handover blindly, i.e. without having received measurement reports from the UE.

Before sending the handover message to the UE, the source eNB prepares one or more target cells. The source eNB selects the target PCell.

The target eNB generates the message used to perform the handover, i.e. the message including the AS-configuration to be used in the target cell(s). The source eNB transparently forwards the handover message/information received from the target to the UE. After receiving the handover message, the UE attempts to access the target PCell at the first available random access channel (RACH) occasion, i.e. the handover is asynchronous, or at the first available physical uplink shared channel (PUSCH) occasion if rach-Skip is configured.

Upon successful completion of the handover, the UE sends a message used to confirm the handover. Upon having detected handover failure, the UE attempts to resume the radio resource control (RRC) connection either in the source PCell or in another cell using the RRC re-establishment procedure.

Compared to ground users, mobility support for aerial users (e.g., drones) is more challenging because of the following reasons. Unlike ground users, drones can move in any direction in three-dimensions (3D), can have arbitrary trajectory, and typically move faster than ground users.

Additionally, BSs are mainly designed to serve ground users and thus their antennas are down-tilted. The main lobe of a BS antenna thus covers a large part of the surface area of the cell to improve performance for terrestrial UEs.

Accordingly, at ground level the strongest site is typically the closest one. A drone UE on the other hand may be frequently served by the sidelobes of BS antennas, which have lower antenna gains. The coverage areas of the sidelobes may be small and the signals at the edges may drop sharply due to deep antenna nulls. At a given location, the strongest signal might come from a faraway BS, if the gain of the sidelobes of the closer BSs to the drone UE is much weaker. Additionally, the side lobes of BSs may not fully cover the sky and there can be coverage holes (space without coverage service) in the sky that can cause failure of drone's connectivity.

An illustration of some of the above effects can be seen in FIG. 1, which illustrates the maximum-received-power-based cell association patterns at the ground level and at the heights of 50 m, 100 m, and 300 m. At the higher heights, the coverage areas become fragmented and the fragmentation pattern is determined by the lobe structures of the BS antennas. Such fragmented coverage area provided by different BSs makes mobility support in the sky more difficult and can result in frequent handovers.

Another issue in the sky is interference. As the height increases, more BSs have line of sight propagation conditions to drone UEs. As a result, the drone UEs may generate more uplink interference to the neighbor cells while experiencing more downlink interference from the neighbor cells. Due to the increased interference, signal-to-interference-plus-noise ratio (SINR) may become quite poor at certain heights. The degraded SINR might lead to more RLFs. It might also result in more handover failures because measurement reports, handover commands, etc., may get lost during the handover execution procedure.

Given the importance of cellular-connected drones, the 3GPP Release 15, TR 36.777 studied the potential support of LTE for providing connectivity for drones. One of the main goals of the study was to analyze drone mobility performance and to identify efficient handover signaling/mechanisms. The result of this study shows that mobility support for drones is one of the challenging aspects in LTE-to-drone communications.

There currently exist certain challenges. For example, the existing mobility management procedure has difficulties in providing robust mobility support for ubiquitous 3D coverage, particularly for providing connectivity to low altitude drones. To illustrate the challenges of mobility support for drone UEs, FIG. 2 illustrates a simulated example mobility trace for a drone UE moving away from the coverage of a BS antenna sidelobe at the speed of 30 km/h and at the height of 300 m.

The upper subfigure of FIG. 2 illustrates the RSRP measurements by the drone UE, and the bottom subfigure shows the time varying trace of the serving cell SINR. Each numbered RSRP trace (e.g., 10, 12, 14, 16, 18) corresponds to a different cell. In FIG. 2, the vertical dashed line at the beginning (t=0) marks cell selection of cell 10. At about t=3 s, the serving cell RSRP begins to drop, and it drops by 7 dB within 4 s. After 5 s, the neighboring cells become stronger than the serving cell. However, to trigger handover measurement reports, some neighbor cell RSRP should be X dB better than the serving cell, where X is set to 3 in the simulation. From the RSRP traces, it is evident that the RSRPs of the neighbor cells stay relatively low, and none of them is at least 3 dB better than the serving cell before the drone UE declares RLF at t=7 s (marked by the vertical dashed line) due to poor serving cell SINR.

SUMMARY

Based on the description above, certain challenges currently exist with three-dimensional (3D) mobility. Certain aspects of the present disclosure and their embodiments may provide solutions to these or other challenges. For example, particular embodiments include a robust handover (HO) mechanism for 3D mobility management (e.g., for drone user equipments (UEs)) based on reinforcement learning while capturing the inherent tradeoff between drone connectivity performance and handover signaling overhead.

In particular embodiments, the handover mechanism uses various information, such as real-time reference signal received power (RSRP)/reference signal received quality (RSRQ), prior RSRP/RSRQ data, UE's 3D trajectory, and UE's speed to provide effective handover rules for seamless 3D connectivity with small handover signaling overhead. Moreover, particular embodiments jointly optimize handover decisions and UE trajectory in applications in which UE routes are not pre-defined or fixed.

In general, particular embodiments use a machine-learning assisted mobility management procedure for efficient 3D mobility in cellular systems. Particular embodiments include methods for each stage of the procedure including data collection, model training, model usage and model update with and without UE assistance.

According to some embodiments, a method performed by a network node for mobility management comprises obtaining data samples for modeling a wireless network environment that comprises a plurality of cells and building a machine learning model of the wireless network using the obtained data samples. The machine learning model (e.g., reinforcement learning model) is trained to determine a sequence of handovers for a wireless device among the plurality of cells for the wireless device to traverse from a source cell to a destination cell. The method further comprises receiving mobility information for a wireless device, determining one or more handover operations for the wireless device based on the mobility information, and transmitting the one or more handover operations to the wireless device.

In particular embodiments, obtaining data samples for modeling the wireless network environment comprises obtaining one or more of base station locations and base station antenna patterns. Obtaining data samples may comprise obtaining propagation environment information including a location of obstacles in the propagation environment. Obtaining data samples may comprise obtaining wireless signal characteristics for a plurality of locations in the wireless network environment. The wireless signal characteristics may include one or more of reference RSRP, RSRQ, and signal to interference plus noise ratio (SINR). Obtaining data samples may comprise obtaining data samples from one or more wireless devices.

In particular embodiments, the machine learning model is trained to determine a sequence of handovers for a wireless device among the plurality of cells for the wireless device to traverse from a source cell to a destination cell by minimizing one or more of a number of handovers, radio link failure (RLF), and ping-pong handovers.

In particular embodiments, the mobility information comprises one or more of a position of the wireless device, a velocity of the wireless device, a mobility pattern of the wireless device, a wireless signal quality of a serving cell for the wireless device, and a wireless signal quality of a neighbor cell for the wireless device.

In particular embodiments, the mobility information may comprise a destination, and determining one or more handover operations for the wireless device comprises determining a sequence of handover operations for the wireless device to navigate to the destination. The network node may transmit the sequence of handover operations to the wireless device in advance of the wireless device navigating to the destination. The network node may transmit the sequence of handover operations to the wireless device as the wireless device navigates to the destination.

In particular embodiments, the network node comprises one of a base station and a core network node.

According to some embodiments, a network is capable of mobility management. The network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

According to some embodiments, a method performed by a wireless device for mobility management comprises transmitting mobility information to a network node. The network node comprises a machine learning model trained to determine a sequence of handovers for a wireless device among a plurality of cells for the wireless device to traverse from a source cell to a destination cell. The method further comprises receiving one or more handover operations from the network node machine learning model and performing a handover according to one of the received one or more handover operations.

In particular embodiments, the machine learning model is trained to determine a sequence of handovers for a wireless device among the plurality of cells for the wireless device to traverse from a source cell to a destination cell by minimizing one or more of a number of handovers, RLF, signaling overhead, and ping-pong handovers.

In particular embodiments, the mobility information comprises one or more of a position of the wireless device, a velocity of the wireless device, a wireless signal quality of a serving cell for the wireless device, and a wireless signal quality of a neighbor cell for the wireless device.

In particular embodiments, the mobility information comprises a destination, and the received one or more handover operations comprise a sequence of handover operations for the wireless device to navigate to the destination. The wireless device may receive the sequence of handover operations in advance of navigating to the destination. The wireless device may receive the sequence of handover operations while navigating to the destination.

According to some embodiments, a wireless device is capable of mobility management. The wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

Certain embodiments may provide one or more of the following technical advantages. For example, particular embodiments for supporting 3D mobility (e.g., for drone UEs) facilitate efficient and flexible handover decisions while considering UE connectivity as well as handover signaling.

In fixed-drone trajectory scenarios, the network uses machine learning tools to specify when handover must be done to maintain connectivity while reducing handover signaling and ping-pong handover rate. In addition, when possible, the UE trajectory (e.g., drone's route) can be optimized along with handover rules to improve the drone mobility support.

In summary, particular embodiments include at least the following advantages: (a) improving UE connectivity in 3D by using various information such as RSRP/RSRQ values, UE route, UE speed, flight/mobility regulations (e.g., no-fly zones), and information about the environment (e.g., location and size of buildings); (b) reducing the number of handovers and improving the robustness of handovers; (c) joint design of UE 3D trajectory (e.g., in drone scenarios) and handover rules to enhance UE mobility performance in term of various metrics such as RSRP/RSRQ values, signaling overhead, the number of radio link failures, and the rate of ping-pong handovers; and (d) using a feedback mechanism (e.g., event-triggered feedback) to dynamically update handover decisions/parameters to improve the performance.

Particular embodiments support UE mobility in 3D, including drone UEs or terrestrial UEs moving in 3D (e.g., uphill).

BRIEF DESCRIPTION OF THE DRAWINGS

For a more complete understanding of the disclosed embodiments and their features and advantages, reference is now made to the following description, taken in conjunction with the accompanying drawings, in which:

FIG. 11 illustrates a schematic block diagram of a wireless device and a network node in a wireless network, according to certain embodiments;

DETAILED DESCRIPTION

As described above, certain challenges currently exist with three-dimensional (3D) mobility. For example, unlike ground users, drones can move in any direction in three-dimensions, can have arbitrary trajectory, and typically move faster than ground users. Additionally, base stations (BSs) are mainly designed to serve ground users and thus their antennas are down-tilted. The main lobe of a base station antenna thus covers a large part of the surface area of the cell to improve performance for terrestrial user equipment (UEs).

A drone UE, on the other hand, may be frequently served by the sidelobes of base station antennas, which have lower antenna gains. The coverage areas of the sidelobes may be small and the signals at the edges may drop sharply due to deep antenna nulls. At a given location, the strongest signal might come from a faraway base station. Additionally, the side lobes of base stations may not fully cover the sky resulting in coverage holes that can cause drone connectivity failure.

Certain aspects of the present disclosure and their embodiments may provide solutions to these or other challenges. For example, particular embodiments use a machine-learning assisted mobility management procedure for efficient 3D mobility in cellular systems. Particular embodiments include methods for each stage of the procedure including data collection, model training, model usage and model update with and without UE assistance.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

A common example of a 3D mobility scenario is a cellular-connected drone system in which drone UEs are served by ground base stations. An example is illustrated in FIG. 3.

Figure 1:
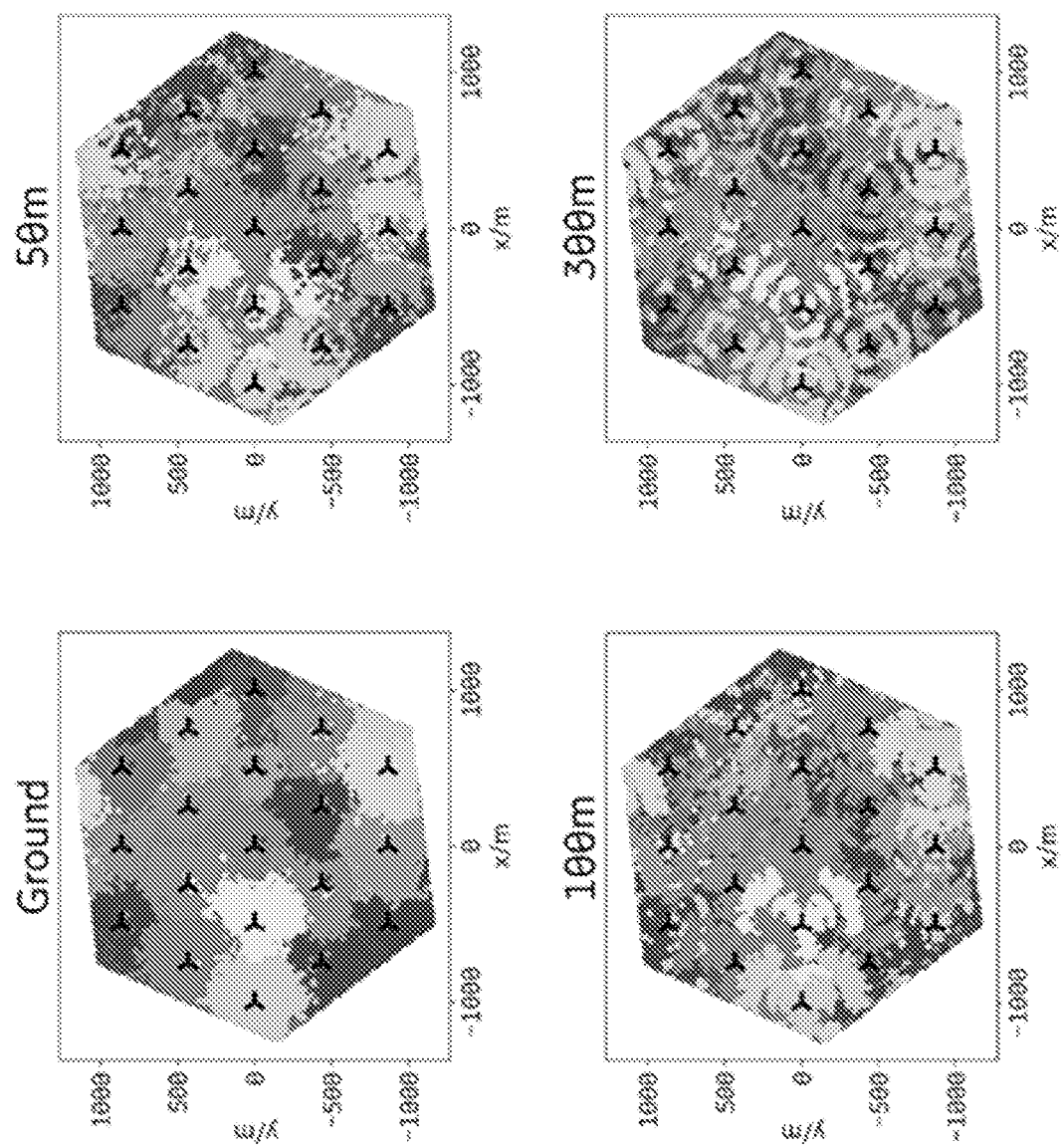
FIG. 1 includes four graphs illustrating the maximum-received-power-based cell association patterns at the ground level and at various heights above ground level.
Figure 2:
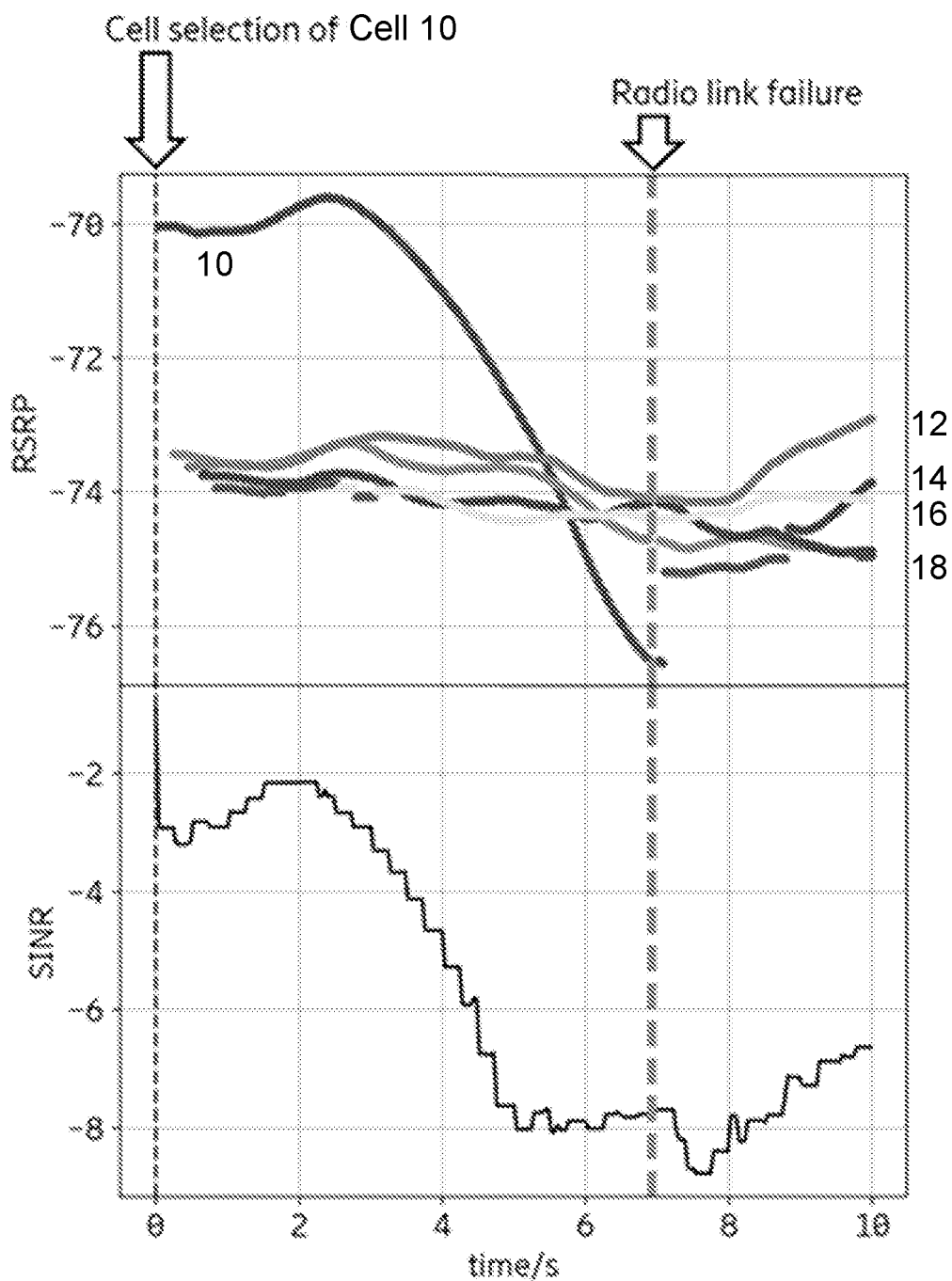
FIG. 2 is an example mobility trace for a drone UE moving away from the coverage of a base station antenna sidelobe at the speed of 30 km/h and at the height of 300 m.
Figure 3:
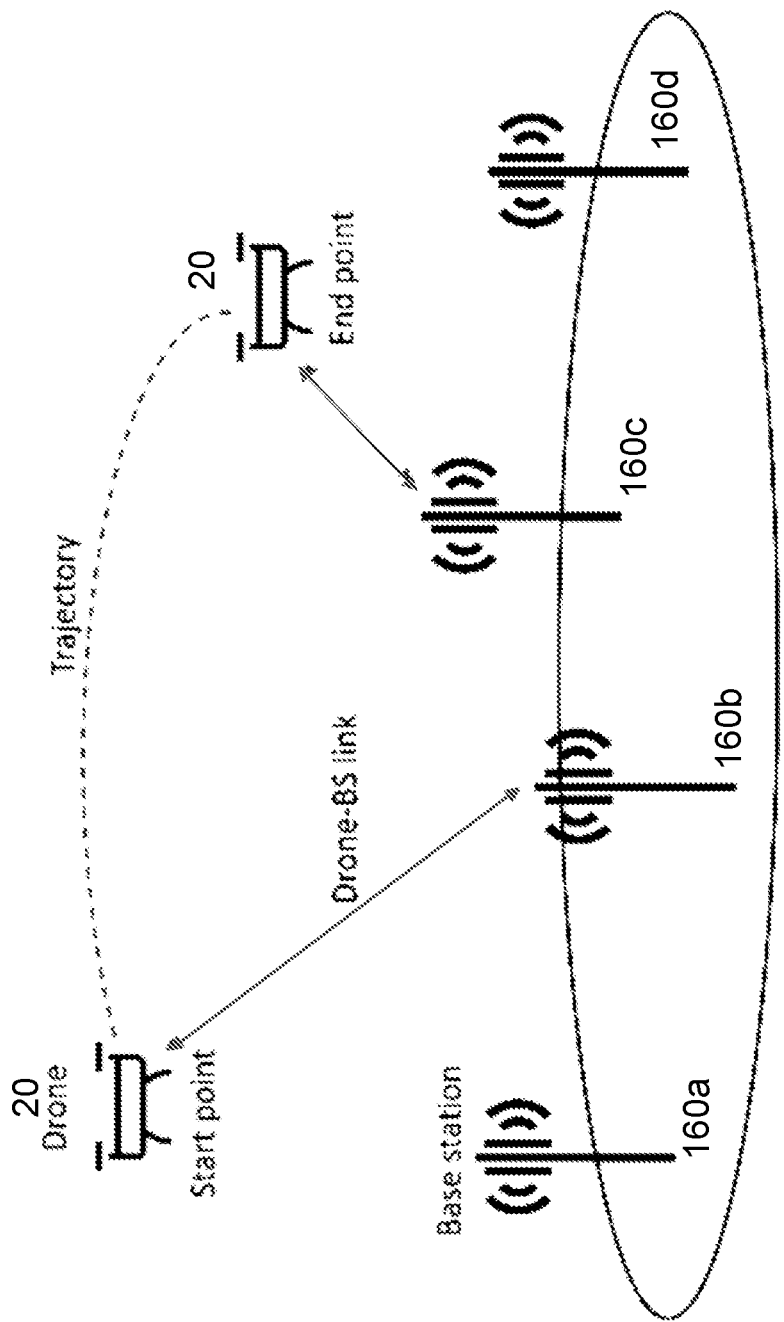
FIG. 3 is a network diagram illustrating 3D mobility support in a cellular-connected drone scenario.

FIG. 3 is a network diagram illustrating 3D mobility support in a cellular-connected drone scenario. Drone 20 moves from a start location to a destination on a pre-defined fixed route or a flexible route (which is not fixed). During the movement, drone 20 connects with base stations 160 to exchange necessary information for control, navigation, and communication. To provide seamless connectivity to mobile drone 20, the drone's connection may change from one base station 160 to another during a handover process.

Particular embodiments described herein include an efficient mobility management mechanism that can ensure connectivity requirements while reducing costs (e.g., overhead, radio link failures (RLF), ping-pong handover, etc.) associated with the handover process.

Particular embodiments include a method based on reinforcement learning to achieve efficient 3D mobility. The method involves data collection for developing a machine learning model, building and training the model, deploying the model, and updating the model. A flow chart of the proposed method is illustrated in FIG. 4.

Figure 4:
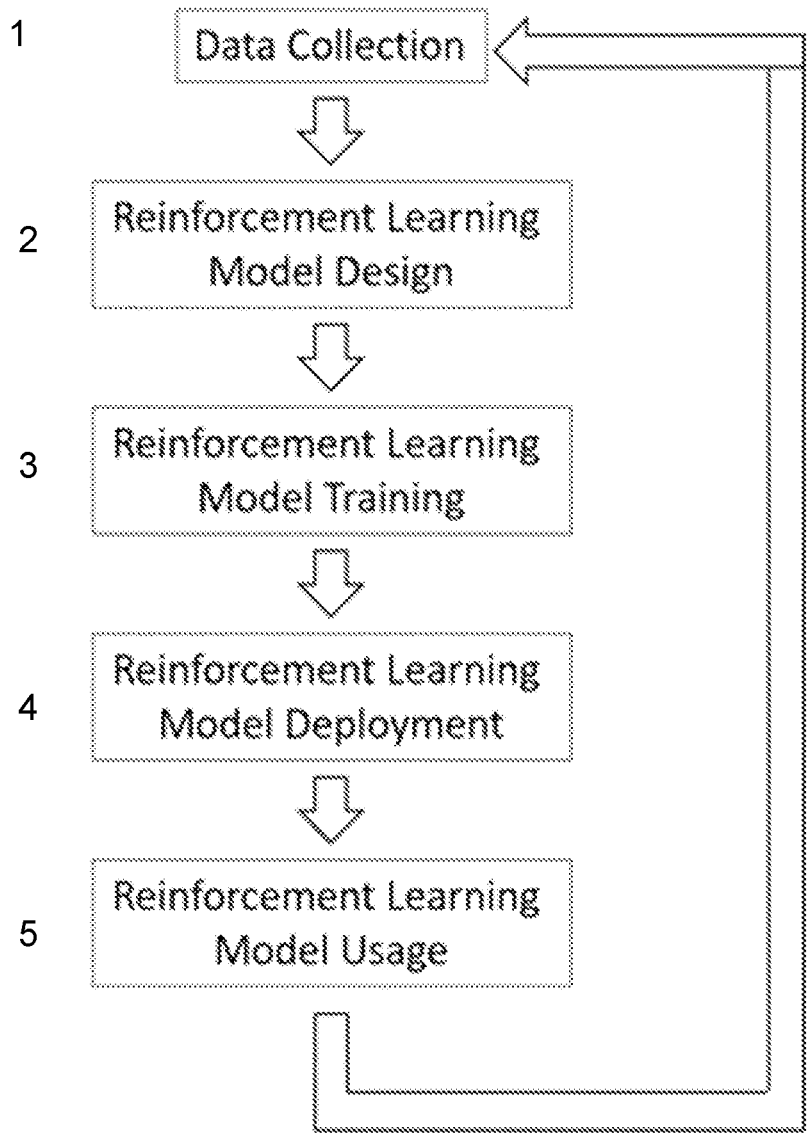
FIG. 4 is a flowchart illustrating an example reinforcement learning based 3D mobility management method.

FIG. 4 is a flowchart illustrating an example reinforcement learning based 3D mobility management method. A first step includes data collection for developing the machine learning model. To build the machine learning model, data is collected. The types of data may include reference signal receive power (RSRP), reference signal receive quality (RSRQ), and signal to interference plus noise ratio (SINR) values within a desired 3D space, network layout and configuration such as base station locations, base station antennas patterns, and propagation environment such as the 3D locations of buildings/obstacles (including height and shape of the buildings).

In some embodiments, existing data can be used. New data can be collected and integrated with existing data to enhance the quality and accuracy of the data. Particular embodiments focus on how new RSRP/RSRQ/SINR data can be collected.

In some embodiments, the gNB configures one or more UEs to measure and report RSRP/RSRQ/SINR and the UE's 3D position periodically or in an event triggered manner.

In some embodiments, the gNB configures one or more UEs to measure and report RSRP/RSRQ/SINR periodically or in an event triggered manner, and the gNB estimates the UE's 3D position corresponding to the reported measurements.

In some embodiments, the network deploys one or more UEs dedicated to data collection. These UEs measure RSRP/RSRQ/SINR and their 3D positions periodically. The UEs may store the data locally which are fetched after the data collection mission. Alternatively, the UEs transmit the data to the network during the data collection mission.

A second step includes building and training the model. In general, always connecting to the strongest base station (i.e., the base station that provides maximum RSRP, RSRQ or SINR) may not be efficient for UE connectivity and handover signaling overhead. Making a handover decision solely based on the current maximum RSRP/RSRQ/SINR can lead to many subsequent handovers, which is not efficient. In addition, it can cause ping-pong handovers and connectivity failure. Considering this scenario, in particular embodiments, an efficient handover mechanism uses an optimal sequential decision-making scheme to build connections between the UE and the potential serving base stations.

To achieve optimal sequential handover decision-making for supporting 3D mobility (e.g., for drone UEs), a reinforcement learning (RL) model is built. In RL, an agent interacts with an environment by choosing actions based on the environment's current state (or an observation of the state). For a performed action in a state, the agent receives feedback in terms of a scalar reward and the environment transits to a new state. The reward and new state are stochastically determined by the dynamics of the environment, which in general are not known to the agent. The goal for the agent is to find an optimal policy to maximize the total reward.

In some embodiments, the mobility management RL model uses UE's position, UE's velocity, the UE's serving cell RSRP/RSRQ/SINR values, and the UE's neighbor cells' RSRP/RSRQ/SINR as the state of the model.

In some embodiments, the mobility management RL model uses a scalar reward function which depends on which serving cell for the UE to connect to, the corresponding RSRP/RSRQ/SINR values of the potential serving cell, handover signaling, and the loads of the cells.

In some embodiments, the mobility management RL model uses a reward function to account for real-time RSRP/RSRQ/SINR values, number of handovers, RLF, and ping-pong handovers.

In some embodiments, the mobility management RL model uses a set of candidate cells that the UE may connect to as the action space.

In some embodiments, the mobility management RL model uses a set of cells that the UE may connect to and a set of UE's movement actions (moving directions, acceleration/deceleration) as the action space.

After formulating the mobility management RL model, step 3 is to train the model using the data so that the model can approximate the value functions. For example, the optimal action value function denoted as $Q^*(s, a)$, which is the expected return when taking action a in state s and following an optimal policy $\pi^*$. Once $Q^*(s, a)$ values are computed, the agent can act optimally as $\pi^*(s)=\mathrm{argmax}_a Q^*(s, a)$. Possible actions include performing handover and UE's movement, among others.

In some embodiments, the optimal action values are computed by Q-learning algorithm. In some embodiments, a neural network is trained as a function approximator for either the optimal action values or the optimal policy of the agent. This is a deep reinforcement learning approach. Training the neural network involves data preprocessing and normalization, choosing learning rate, ∈-greedy parameter (balance exploitation and exploration), batch size, memory size, optimizer, and activation function for the neural network. An example is illustrated in FIG. 5.

Figure 5:
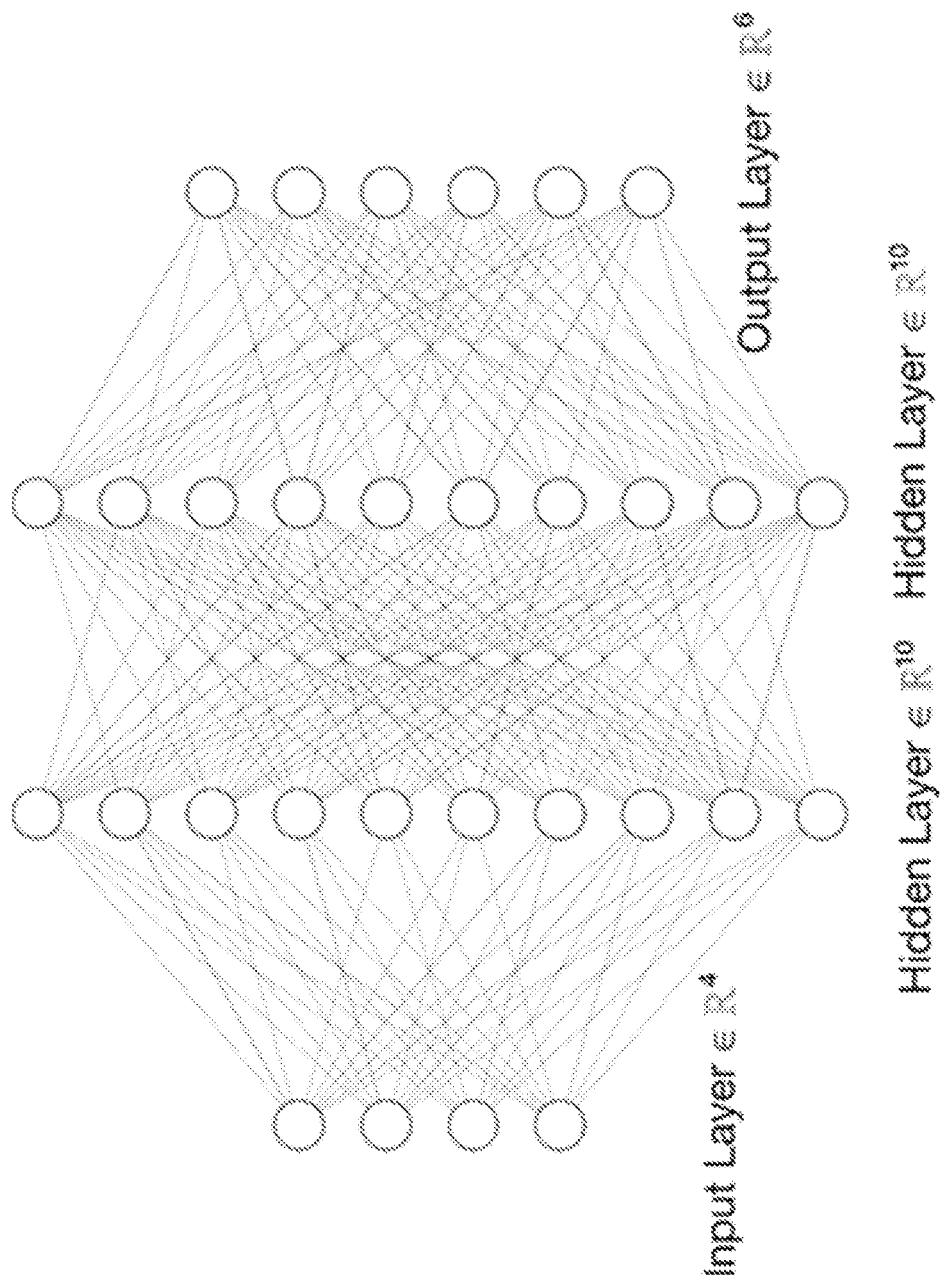
FIG. 5 illustrates an example neural network for approximating the optimal reinforcement learning action values.

FIG. 5 illustrates an example neural network for approximating the optimal RL action values. In some embodiments, deep Q-learning network (DQN) is used to determine Q values of all possible actions and then identify the optimal action.

In some embodiments, a central entity stores all the data and trains a single machine learning model. Such an entity could be a network node, such as a base station or a core network node, or a device in the cloud.

In some embodiments, the machine learning models can be trained per cell or group of cells. In this case, each cell or group of cells can run a model locally and exchange the outputs with neighbors to collaboratively carry out the 3D mobility management.

Figure 6:
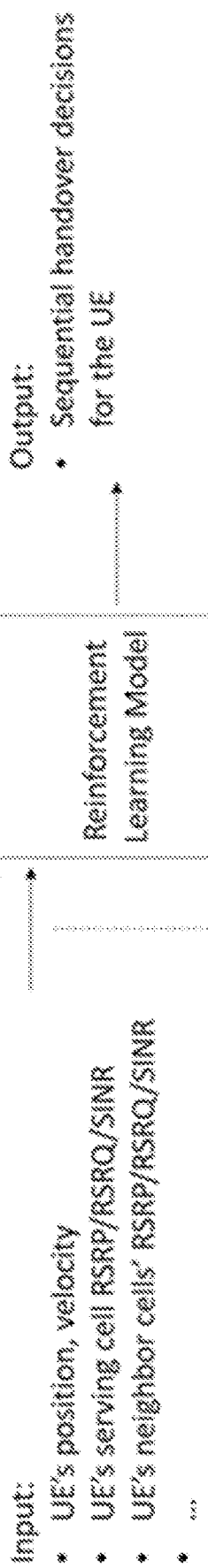
FIG. 6 is a block diagram illustrating input and output of the reinforcement learning model.

In general, the trained RL model will output sequential handover decisions based on inputs, as illustrated in FIG. 6.

FIG. 6 is a block diagram illustrating input and output of the reinforcement learning model. The inputs may include UE position and/or velocity, UE serving cell RSRP/RSRQ/SINR, and UE neighbor cell RSRP/RSRQ/SINR. The outputs may include sequential handover decisions for the UE.

Returning to FIG. 4, a fourth step is to deploy the model and a fifth step is to use the model. For example, after the model is built, the next step is to deploy and use the model in networks.

In some embodiments, the model is deployed and executed at a central entity, which could be a network node or a device in the cloud, i.e., the central entity is the RL agent. In some embodiments, the model is deployed and executed at each gNB, i.e., the gNB is the RL agent. In some embodiments, the model is signaled to the UE that executes the model, i.e., the UE is the RL agent.

If information of all states such as UE trajectory is known a priori, the mobility management decisions can be determined using the model in advance. The network can communicate the decisions to the UE if the model is not executed at the UE. In general, the mobility management decisions are determined on the fly.

In some embodiments, the agent determines the decisions periodically. In some embodiments, the RL agent determines the decisions in an event triggered manner. For example, the agent determines a new action if the UE has moved more than a threshold distance from the previous location.

In some embodiments, the mobility management decisions are fully controlled by the network. In this case, the RL agent passes the output of the model to the network that determines the final mobility management decision.

Some embodiments use the model with UE assistance. A legacy mobility management procedure in LTE/NR is typically dependent on UE measurement reports, which are compiled based on signal strength measurements for serving and neighbor cells performed by the UE. While the accuracy of mobility management decisions can be improved with proper training/testing of the model, an implausible decision from the model cannot be ruled out. This calls for UE assistance to weed out poor mobility management decisions predicted by the model.

In one embodiment, the UE executes the mobility management decision conveyed by the network or determined by itself if the UE is the RL agent, when one or more predefined/preconfigured conditions are satisfied. These conditions could be: (a) the target cell signal strength/quality satisfies predefined condition(s) (e.g., the strength/quality exceeds certain preconfigured threshold(s)); (b) the source cell signal strength/quality satisfy predefined condition(s) (e.g., the strength/quality is lower than certain preconfigured threshold(s)); and (c) the source cell signal strength/quality are better than the target cell signal strength/quality by some thresholds.

In some embodiments, the UE indicates to the network whether it agrees with the mobility management decision output by the model. For example, when the conditions are satisfied, the UE agrees with the decision (ACK), otherwise it does not (NACK). The UE may feedback 1-bit information, for example, to indicate if it agrees with the handover decision. UE may feedback additional information related to the conditions which are not satisfied, or other UE-specific information such as UE altitude or height which may help the network to improve the model.

In some embodiments, the network leverages the UE feedback to improve the model. For example, based on the UE explicit feedback the network decides whether to use the model or legacy mobility management procedure.

In some embodiments, the network decides whether to use the model or legacy mobility management procedure based on implicit feedback such as RLF statistics, ping-pong handovers, or a combination of the feedback collected from various mechanisms.

The network may implement this decision (model or legacy mobility management procedure) at various levels such as UE-specific, specific to a group of UEs (e.g., drone UEs above or below certain altitudes, etc.), and cell level.

Another step includes updating the model. While the model is deployed and used in the network, the model can be updated by adapting to any changes in the environment/scenario and incorporating new data. The model update can be performed periodically or in an event-triggered manner. For example, the event may be that the number of UE feedbacks that disagree with the model output exceeds a threshold. This may indicate the model is not performing well and thus triggers an update. During the update, the network may switch the UE back to legacy mobility management mode.

In one embodiment, the network updates the mobility management model periodically or in an event-triggered manner.

Figure 7:
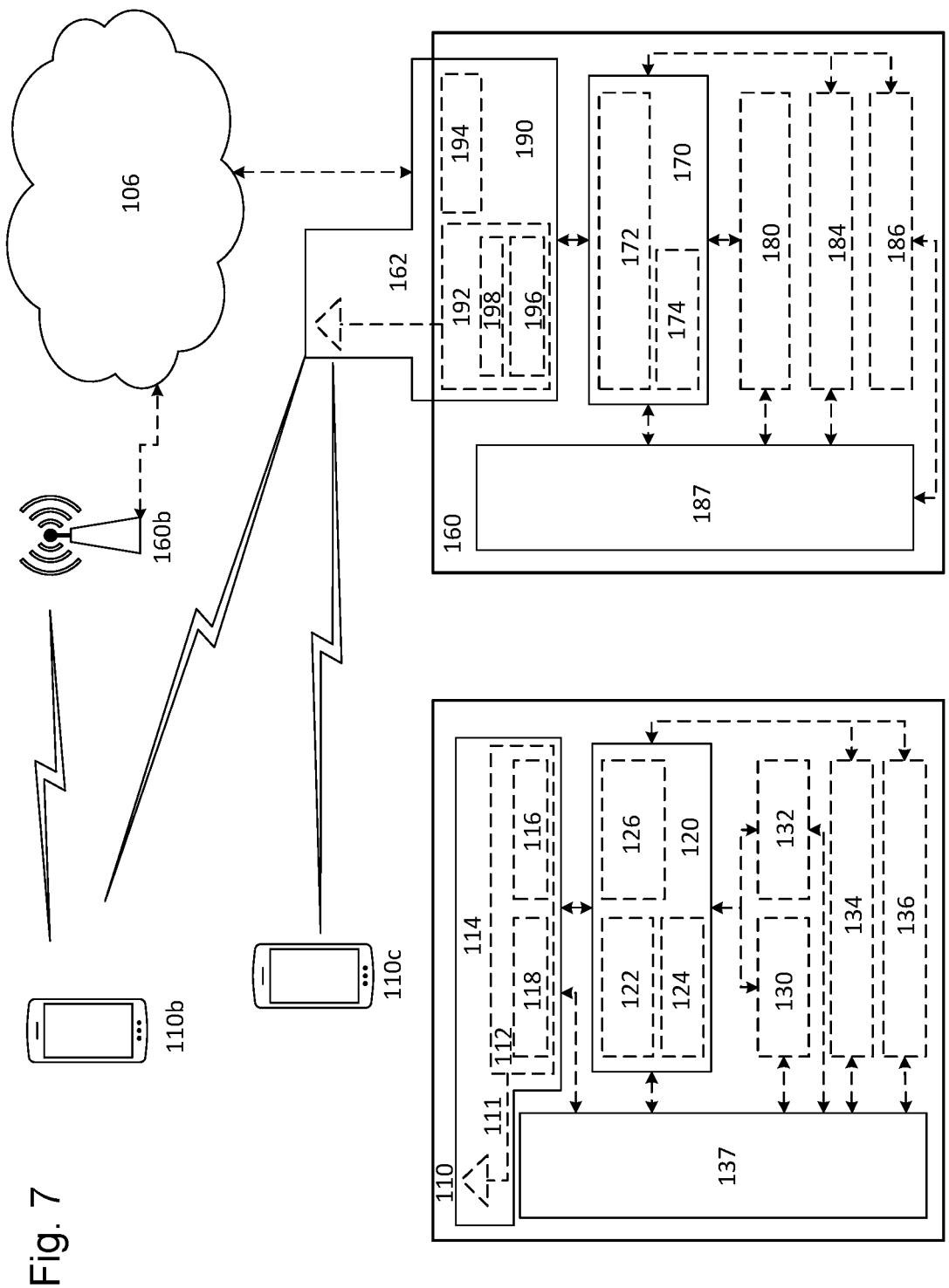
FIG. 7 is a block diagram illustrating an example wireless network.

FIG. 7 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 8:
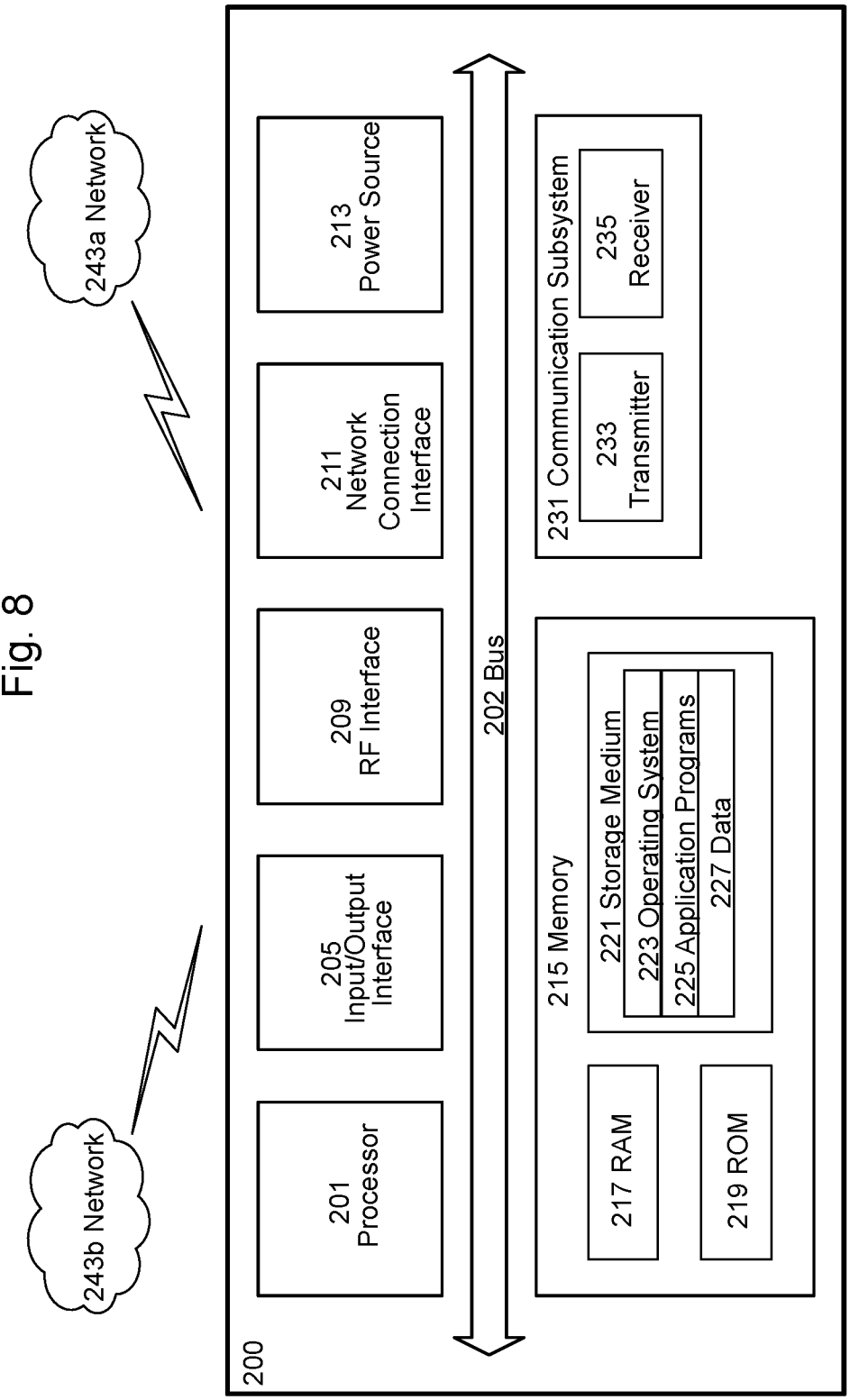
FIG. 8 illustrates an example user equipment, according to certain embodiments.

FIG. 8 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
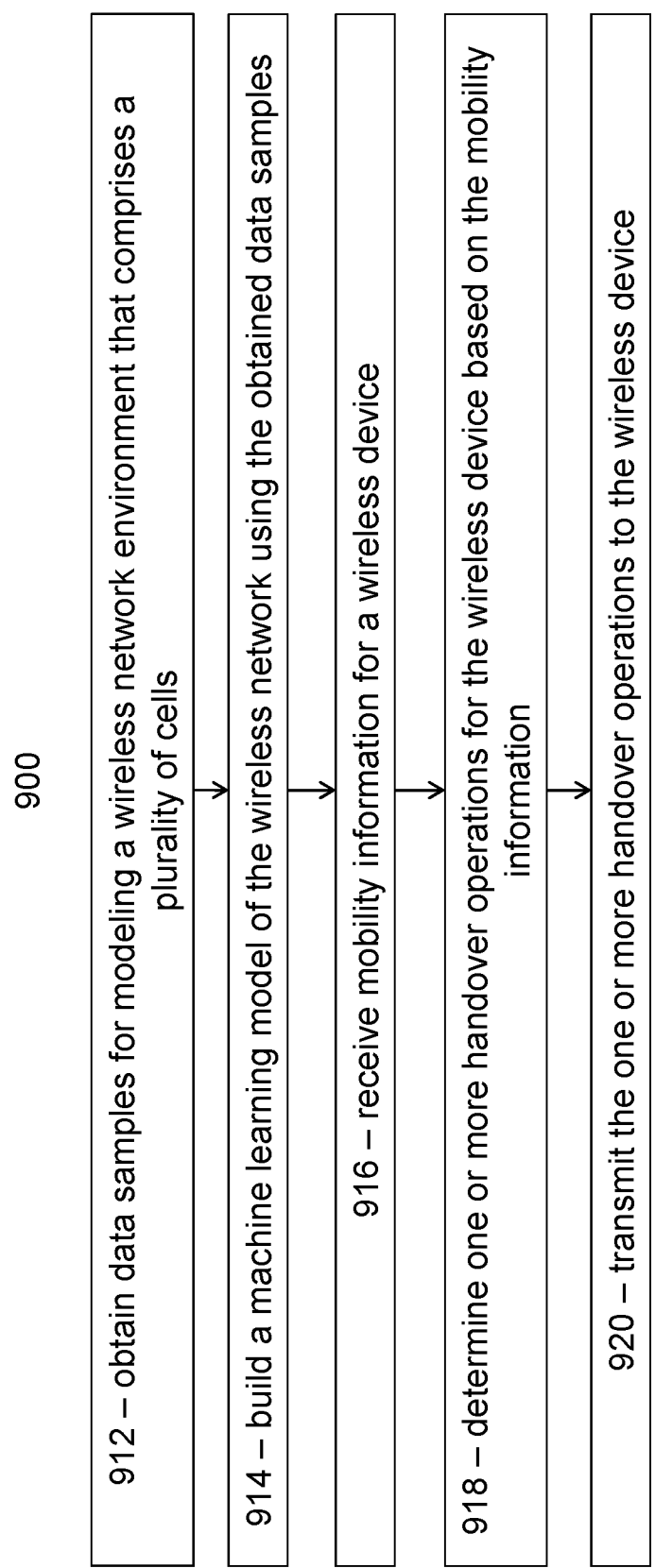
FIG. 9 is flowchart illustrating an example method in a wireless device, according to certain embodiments.

FIG. 9 is a flowchart illustrating an example method in a network node, according to certain embodiments. In particular embodiments, one or more steps of FIG. 9 may be performed by network node 160 described with respect to FIG. 7. In some embodiments, one or more steps of FIG. 9 may be performed by a core network node.

In general, the network node will collect data samples regarding antenna coverage for the network and use the data samples to build a machine learning model that can be used to predict efficient handover locations and predict routes through the wireless network to avoid coverage holes.

The method begins at step 912, where the network node (e.g., network node 160) obtains data samples for modeling a wireless network environment that comprises a plurality of cells. For example, the network node may obtain one or more of base station locations and base station antenna patterns. Obtaining data samples may comprise obtaining propagation environment information including a location of obstacles (e.g., buildings, etc.) in the propagation environment. Obtaining data samples may comprise obtaining wireless signal characteristics for a plurality of locations in the wireless network environment. The wireless signal characteristics may include one or more of RSRP, RSRQ, and SINR. Obtaining data samples may comprise obtaining data samples from one or more wireless devices.

For example, wireless devices may be deployed in advance to collect information and send data to the network node. In another example, the wireless devices may report data in the course of their normal movement.

In some embodiments, the network node obtains data samples according to any of the embodiments and examples described above, such as those described with respect to FIGS. 3-6.

At step 914, the network node builds a machine learning model of the wireless network using the obtained data samples. The machine learning model is trained to determine a sequence of handovers for a wireless device among the plurality of cells for the wireless device to traverse from a source cell to a destination cell.

In particular embodiments, the machine learning model (e.g., reinforcement learning model) is trained to determine a sequence of handovers for a wireless device among the plurality of cells for the wireless device to traverse from a source cell to a destination cell by minimizing one or more of a number of handovers, radio link failure (RLF), signaling overhead, and ping-pong handovers, according to any of the embodiments and examples described above, such as those described with respect to FIGS. 3-6.

At this point the machine learning model is trained and is ready to be deployed for use by wireless devices (e.g., drones) in the network. The network node can receive mobility information from the wireless devices, determine route and handover information, and provide the response to the wireless devices.

At step 916, the network node receives mobility information for a wireless device. In particular embodiments, the mobility information comprises one or more of a position of the wireless device, a velocity of the wireless device, a mobility pattern of the wireless device, a destination for the wireless device, a wireless signal quality of a serving cell for the wireless device, and a wireless signal quality of a neighbor cell for the wireless device. The mobility information may include any of the mobility information described with respect to any of the embodiments and examples described above, such as those described with respect to FIGS. 3-6.

At step 918, the network node determines one or more handover operations for the wireless device based on the mobility information. For example, based on the mobility information, the learning model is able to determine an optimal next hop and/or an optimal route to a destination. As one example, the mobility information may comprise a destination, and determining one or more handover operations for the wireless device comprises determining a sequence of handover operations for the wireless device to navigate to the destination.

The network node may determine one or more handover operations for the wireless device according to any of the embodiments and examples described above, such as those described with respect to FIGS. 3-6.

At step 920, the network node transmits the one or more handover operations to the wireless device. For example, the network node may transmit a next hop handover or a sequence of handovers. The network node may transmit the sequence of handover operations to the wireless device in advance of the wireless device navigating to the destination. The network node may transmit the sequence of handover operations to the wireless device as the wireless device navigates to the destination. The network node may update an original sequence of handover operations as the wireless device navigates to the destination.

Modifications, additions, or omissions may be made to method 900 of FIG. 9. Additionally, one or more steps in the method of FIG. 9 may be performed in parallel or in any suitable order.

Figure 10:
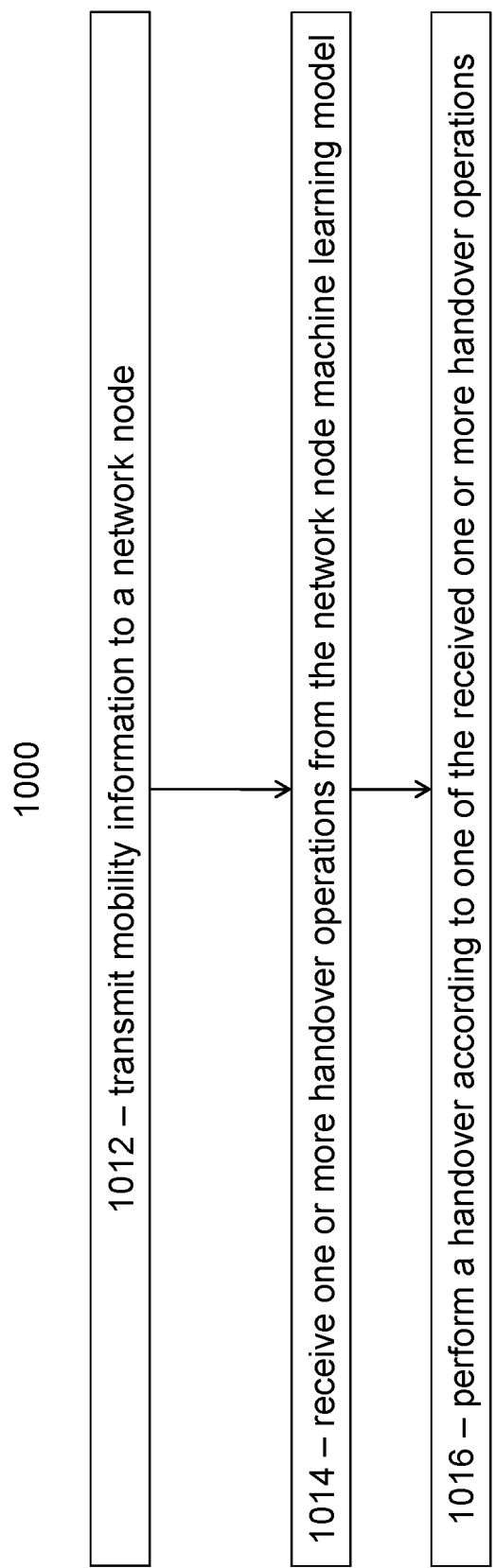
FIG. 10 is flowchart illustrating an example method in a network node, according to certain embodiments.

FIG. 10 is a flowchart illustrating another example method in a wireless device, according to certain embodiments. In particular embodiments, one or more steps of FIG. 10 may be performed by wireless device 110 described with respect to FIG. 7.

The method begins at step 1012, where the wireless device (e.g., wireless device 110) transmitting mobility information to a network node. For example, the wireless device may transmit mobility information to the network node as described with respect to step 916 of FIG. 9. For example, the network node may include a machine learning model trained to determine a sequence of handovers for a wireless device among a plurality of cells for the wireless device to traverse from a source cell to a destination cell as described with respect to FIGS. 3-6 and 9. The network node may determining one or more handover operations for the wireless device based on the mobility information.

At step 1014, the wireless device receives one or more handover operations from the network node machine learning model. For example, the wireless device may receive one or more handover operations as described with respect to step 920 of FIG. 9.

At step 1016, the wireless device performs a handover according to one of the received one or more handover operations. For example, the wireless device may perform a handover to a next hop on a route to its destination.

Modifications, additions, or omissions may be made to method 1000 of FIG. 10. Additionally, one or more steps in the method of FIG. 10 may be performed in parallel or in any suitable order.

FIG. 11 illustrates a schematic block diagram of two apparatuses in a wireless network (for example, the wireless network illustrated in FIG. 7). The apparatuses include a wireless device and a network node (e.g., wireless device 110 and network node 160 illustrated in FIG. 7). Apparatuses 1600 and 1700 are operable to carry out the example methods described with reference to FIGS. 9 and 10, respectively, and possibly any other processes or methods disclosed herein. It is also to be understood that the methods of FIGS. 9 and 10 are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 11, apparatus 1600 includes receiving module 1602 configured to receive receiving one or more handover operations from a network node machine learning model, according to any of the embodiments and examples described herein. Determining module 1604 is configured to a perform a handover according to one of the received one or more handover operations, according to any of the embodiments and examples described herein. Transmitting module 1606 is configured to transmit mobility information to a network node, according to any of the embodiments and examples described herein.

As illustrated in FIG. 11, apparatus 1700 includes receiving module 1702 configured to obtain data samples for modeling a wireless network environment that comprises a plurality of cells and to receive mobility information for a wireless device, according to any of the embodiments and examples described herein. Determining module 1704 is configured to determine a machine learning model of the wireless network using the obtained data samples and training the machine learning model to determine a sequence of handovers for a wireless device among the plurality of cells for the wireless device to traverse from a source cell to a destination cell, according to any of the embodiments and examples described herein. Transmitting module 1706 is configured to transmit one or more handover operations to a wireless device, according to any of the embodiments and examples described herein.

Figure 12:
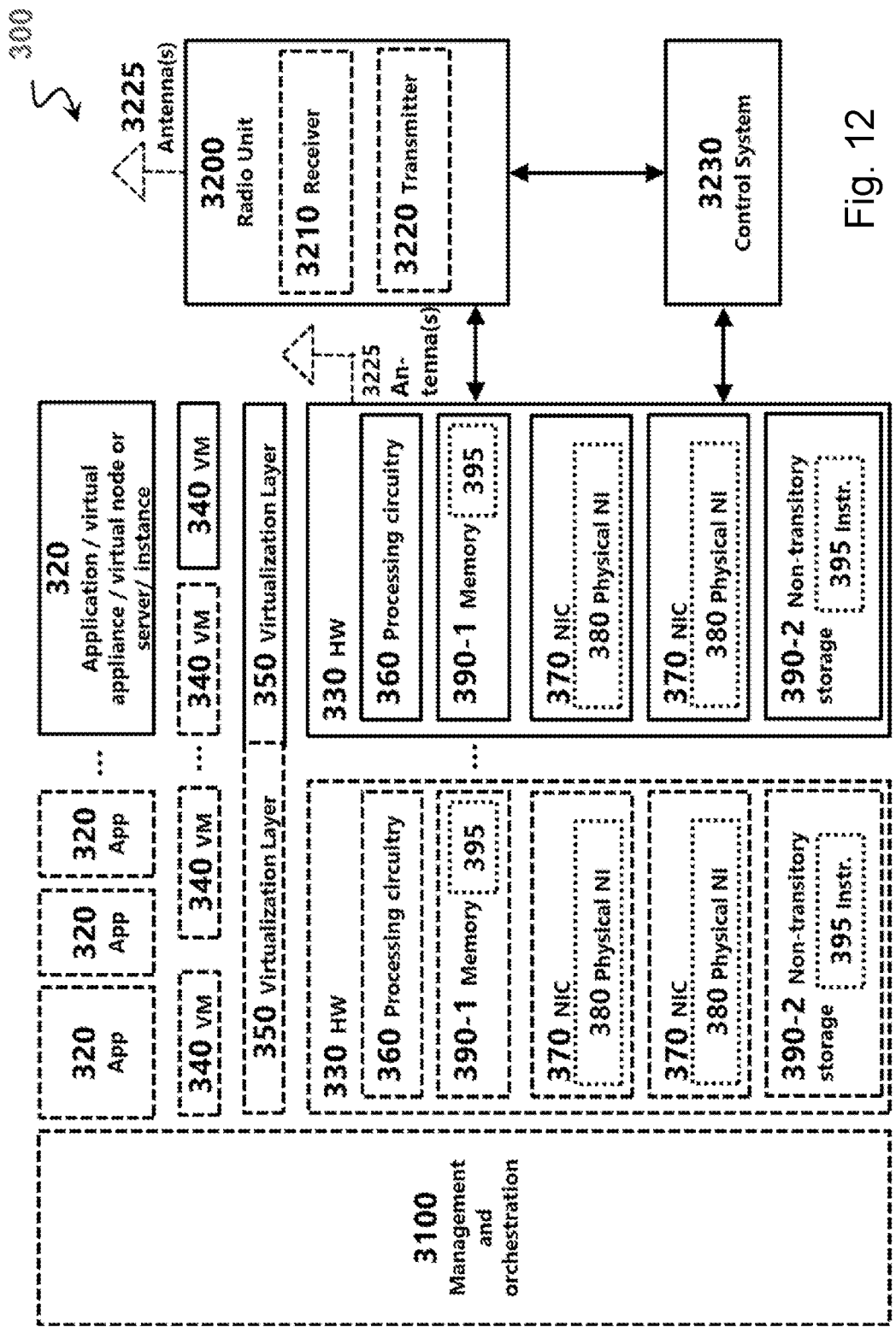
FIG. 12 illustrates an example virtualization environment, according to certain embodiments.

FIG. 12 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 12, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 18:
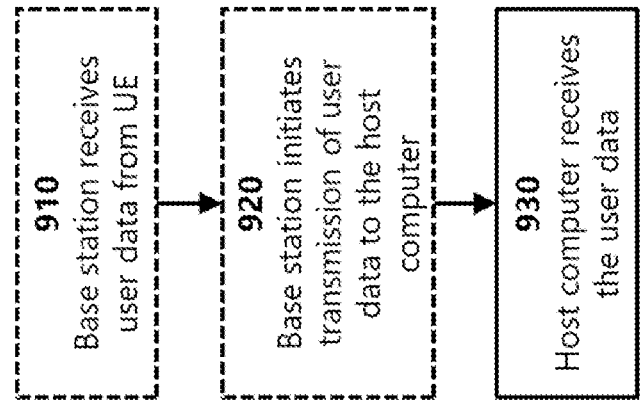
FIG. 18 is a flowchart illustrating a method implemented in a communication system, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 13:
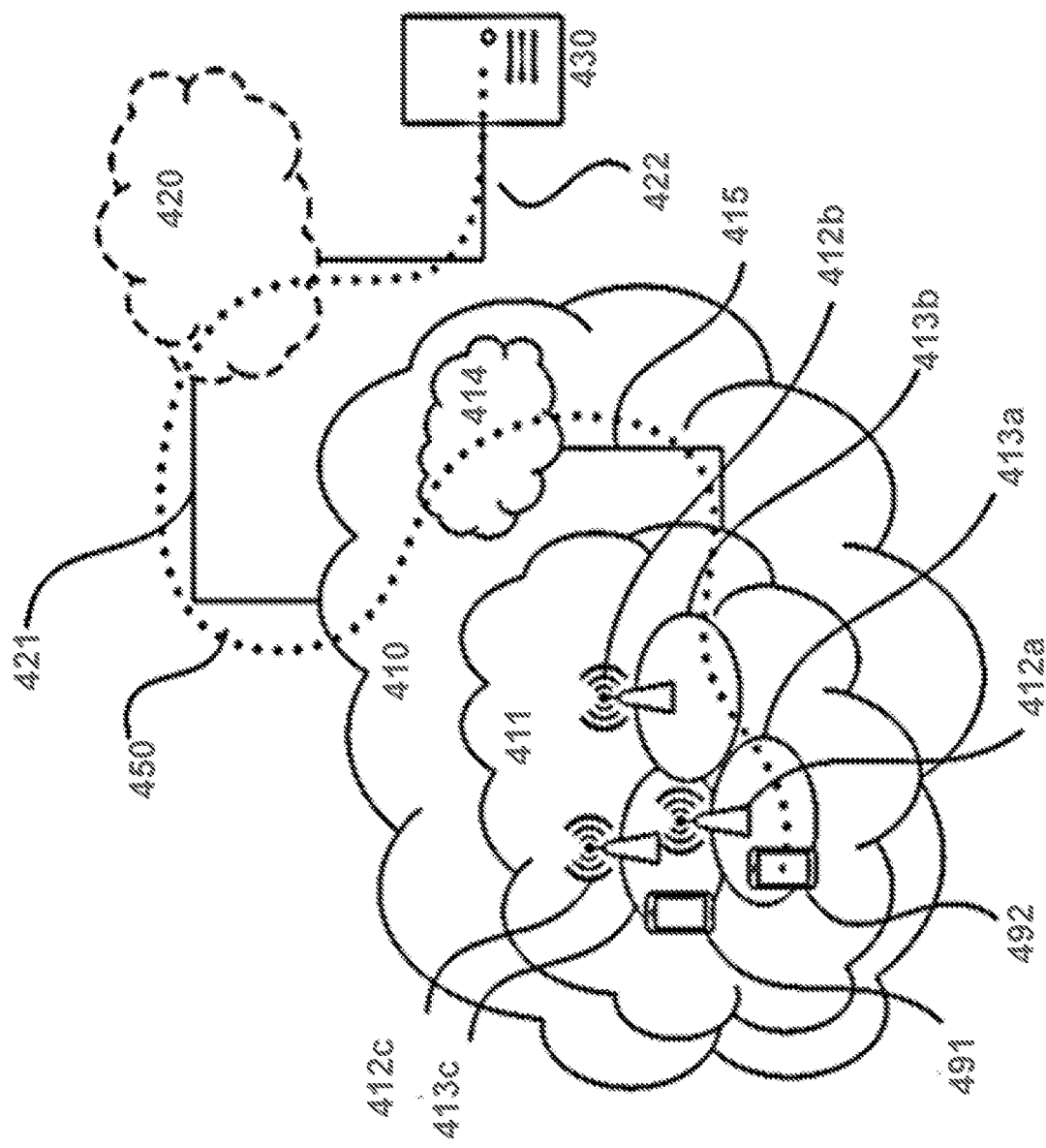
FIG. 13 illustrates an example telecommunication network connected via an intermediate network to a host computer, according to certain embodiments.

With reference to FIG. 13, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 13 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 14:
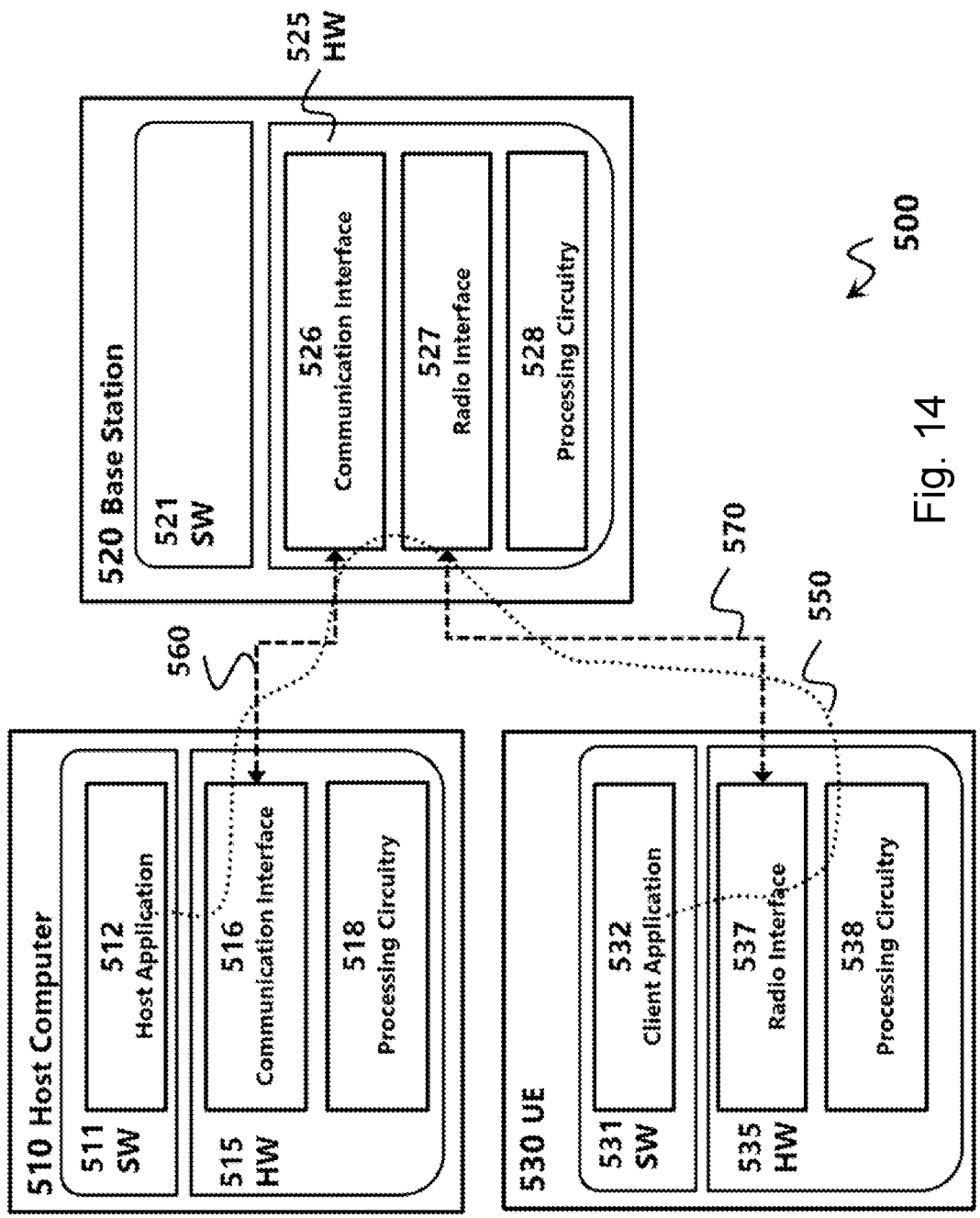
FIG. 14 illustrates an example host computer communicating via a base station with a user equipment over a partially wireless connection, according to certain embodiments.

FIG. 14 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 14. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 14) served by base station 520. Communication interface 526 may be configured to facilitate connection 560 to host computer 510. Connection 560 may be direct, or it may pass through a core network (not shown in FIG. 14) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 14 may be similar or identical to host computer 430, one of base stations 412a, 412b, 412c and one of UEs 491, 492 of FIG. 7, respectively. This is to say, the inner workings of these entities may be as shown in FIG. 14 and independently, the surrounding network topology may be that of FIG. 7.

In FIG. 14, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 15:
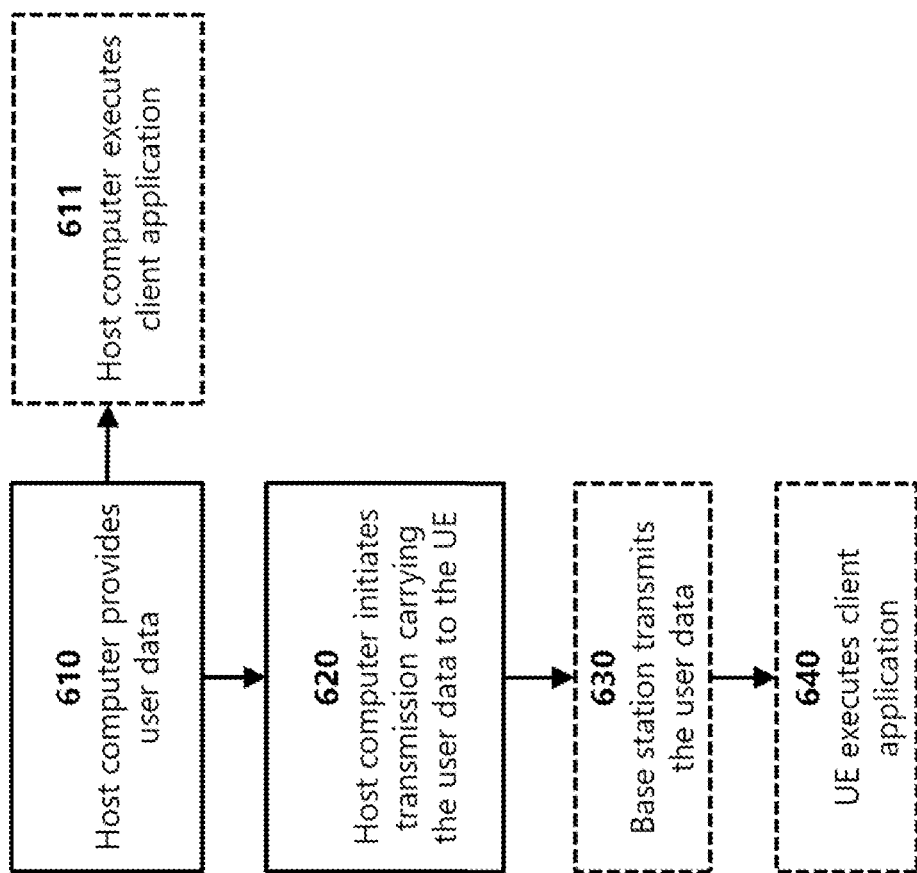
FIG. 15 is a flowchart illustrating a method implemented, according to certain embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 16:
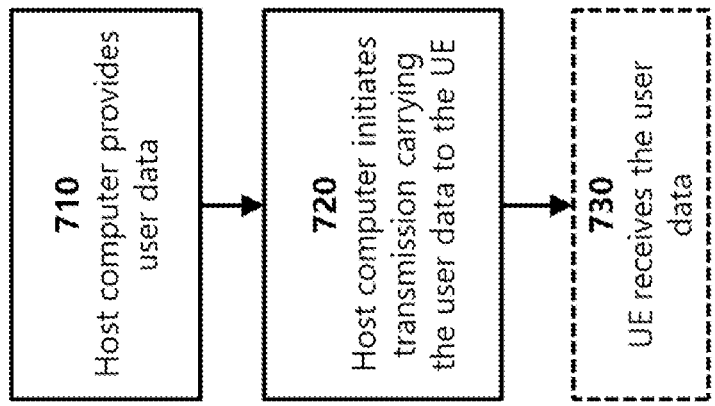
FIG. 16 is a flowchart illustrating a method implemented in a communication system, according to certain embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 17:
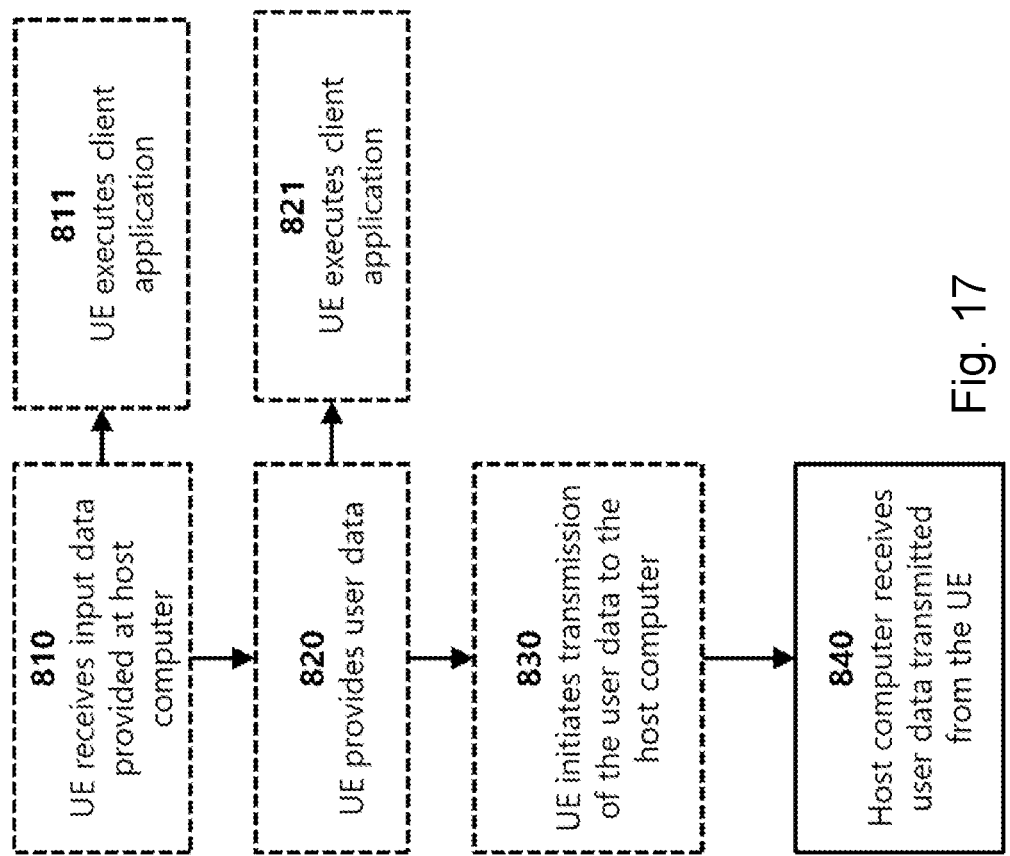
FIG. 17 is a flowchart illustrating a method implemented in a communication system, according to certain embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3D Three Dimension
3GPP 3rd Generation Partnership Project
5G 5th Generation
ABS Almost Blank Subframe
ARQ Automatic Repeat Request
AWGN Additive White Gaussian Noise
AS Access Stratum
BCCH Broadcast Control Channel
BCH Broadcast Channel
BS Base Station
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DQN Deep Q Network
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eMBB Enhanced Mobile Broadband
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
mMTC Massive Machine Type Communications
MSC Mobile Switching Center
MTC Machine-type Communications
NB-IoT Narrowband Internet of Things
NN Neural Network
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RACH Random Access Channel
RL Reinforcement Learning
RLF Radio Link Failure
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RS TD Reference Signal Time Difference
SCH Synchronization Channel
SCell Secondary Cell
SDU Service Data Unit
SFN System Frame Number
SGW Serving Gateway
SI System Information
SIB System Information Block
SINR Signal-to-Interference-plus-Noise Ratio
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UAV Unmanned Aerial Vehicle
UE User Equipment
UL Uplink
UMTS Universal Mobile Telecommunication System
URLLC Ultra-Reliable and Low Latency Communication
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a network node for mobility management, the method comprising:
   obtaining data samples for modeling a wireless network environment that comprises a plurality of cells;
   building a machine learning model of the wireless network using the obtained data samples, wherein the machine learning model is trained to determine a sequence of handovers for a wireless device among the plurality of cells for the wireless device to traverse from a source cell to a destination cell;
   receiving mobility information for a wireless device, wherein the mobility information is used as a state of the machine learning model;
   determining one or more handover operations for the wireless device based on the mobility information; and
   transmitting the one or more handover operations to the wireless device.

2. A network node capable of performing mobility management, the network node comprising processing circuitry operable to:
   obtain data samples for modeling a wireless network environment that comprises a plurality of cells;
   build a machine learning model of the wireless network using the obtained data samples, wherein the machine learning model is trained to determine a sequence of handovers for a wireless device among the plurality of cells for the wireless device to traverse from a source cell to a destination cell;
   receive mobility information for a wireless device, wherein the mobility information is used as a state of the machine learning model;
   determine one or more handover operations for the wireless device based on the mobility information; and
   transmit the one or more handover operations to the wireless device.

3. The network node of claim 2, wherein the processing circuitry is operable to obtain data samples for modeling the wireless network environment by obtaining one or more of base station locations and base station antenna patterns.

4. The network node of claim 2, wherein the processing circuitry is operable to obtain data samples for modeling the wireless network environment by obtaining propagation environment information including a location of obstacles in the propagation environment.

5. The network node of claim 2, wherein the processing circuitry is operable to obtain data samples for modeling the wireless network environment by obtaining wireless signal characteristics for a plurality of locations in the wireless network environment.

6. The network node of claim 5, wherein the wireless signal characteristics include one or more of reference signal received power (RSRP), reference signal received quality (RSRQ), and signal to interference plus noise ratio (SINR).

7. The network node of claim 2, wherein the processing circuitry is operable to obtain data samples for modeling the wireless network environment by obtaining data samples from one or more wireless devices.

8. The network node of claim 2, wherein the machine learning model is trained to determine a sequence of handovers for a wireless device among the plurality of cells for the wireless device to traverse from a source cell to a destination cell by minimizing one or more of a number of handovers, radio link failure (RLF), signaling overhead, and ping-pong handovers.

9. The network node of claim 2, wherein the machine learning model comprises a reinforcement learning model.

10. The network node of claim 2, wherein the mobility information comprises one or more of a position of the wireless device, a velocity of the wireless device, a mobility pattern of the wireless device, a wireless signal quality of a serving cell for the wireless device, and a wireless signal quality of a neighbor cell for the wireless device.

11. The network node of claim 2, wherein the mobility information comprises a destination, and the processing circuitry is operable to determine one or more handover operations for the wireless device by determining a sequence of handover operations for the wireless device to navigate to the destination.

12. The network node of claim 11, wherein the network node transmits the sequence of handover operations to the wireless device in advance of the wireless device navigating to the destination.

13. The network node of claim 11, wherein the network node transmits the sequence of handover operations to the wireless device as the wireless device navigates to the destination.

14. The network node of claim 2, wherein the network node comprises one of a base station and a core network node.

15. A method performed by a wireless device for mobility management, the method comprising:
   transmitting mobility information to a network node, the network node comprising a machine learning model trained to determine a sequence of handovers for a wireless device among a plurality of cells for the wireless device to traverse from a source cell to a destination cell, wherein the mobility information is used as a state of the machine learning model;
   receiving one or more handover operations from the network node machine learning model; and
   performing a handover according to one of the received one or more handover operations.

16. A wireless device capable of mobility management, the wireless device comprising processing circuitry operable to:
   transmit mobility information to a network node, the network node comprising a machine learning model trained to determine a sequence of handovers for a wireless device among a plurality of cells for the wireless device to traverse from a source cell to a destination cell, wherein the mobility information is used as a state of the machine learning model;
   receive one or more handover operations from the network node machine learning model; and
   perform a handover according to one of the received one or more handover operations.

17. The wireless device of claim 16, wherein the machine learning model is trained to determine a sequence of handovers for a wireless device among the plurality of cells for the wireless device to traverse from a source cell to a destination cell by minimizing one or more of a number of handovers, radio link failure (RLF), and ping-pong handovers.

18. The wireless device of claim 16, wherein the machine learning model comprises a reinforcement learning model.

19. The wireless device of claim 16, wherein the mobility information comprises one or more of a position of the wireless device, a velocity of the wireless device, a mobility pattern of the wireless device, a wireless signal quality of a serving cell for the wireless device, and a wireless signal quality of a neighbor cell for the wireless device.

20. The wireless device of claim 16, wherein the mobility information comprises a destination, and the received one or more handover operations comprise a sequence of handover operations for the wireless device to navigate to the destination.

21. The wireless device of claim 20, wherein the wireless device receives the sequence of handover operations in advance of navigating to the destination.

22. The wireless device of claim 20, wherein the wireless device receives the sequence of handover operations while navigating to the destination.

* * * * *